United States Patent [19]

Lohr

[11] 4,374,306
[45] Feb. 15, 1983

[54] ZERO-LOSS AUTOMATIC POLARIZATION PROTECTION DEVICE

[75] Inventor: Joachim Lohr, Berlin, Fed. Rep. of Germany

[73] Assignee: Krone GmbH, Gerlin, Fed. Rep. of Germany

[21] Appl. No.: 208,044

[22] Filed: Nov. 18, 1980

[30] Foreign Application Priority Data

Nov. 20, 1979 [DE] Fed. Rep. of Germany ....... 2947283

[51] Int. Cl.³ ............................................. H04M 1/00
[52] U.S. Cl. .................................... 179/81 R; 179/77; 307/127; 361/246
[58] Field of Search .............. 179/81 R, 77, 70, 90 K, 179/71, 72, 81 A, 81 B, 81 C, 81 D, 81 E; 307/127, 128; 320/25, 26; 361/245, 246

[56] References Cited

U.S. PATENT DOCUMENTS

| B 472,284 | 1/1976 | Janssen et al. | 179/81 R |
| 3,413,487 | 11/1968 | Gershen | 320/26 X |
| 3,789,803 | 2/1974 | Davis et al. | 179/81 R |
| 4,027,223 | 5/1977 | Renz | 307/127 X |

Primary Examiner—G. Z. Rubinson
Assistant Examiner—W. J. Brady
Attorney, Agent, or Firm—Brown & Martin

[57] ABSTRACT

A device for automatically protecting telecommunication apparatus against input signals of improper polarity. The device does not use any energy or voltage after polarity match is established, so that use of the device does not degrade the incoming signal. A set of relay contacts, controlled by diodes, assures that the signal applied to the load is of proper polarity. There is no voltage drop between the exchange line incoming cable and the load.

3 Claims, 1 Drawing Figure

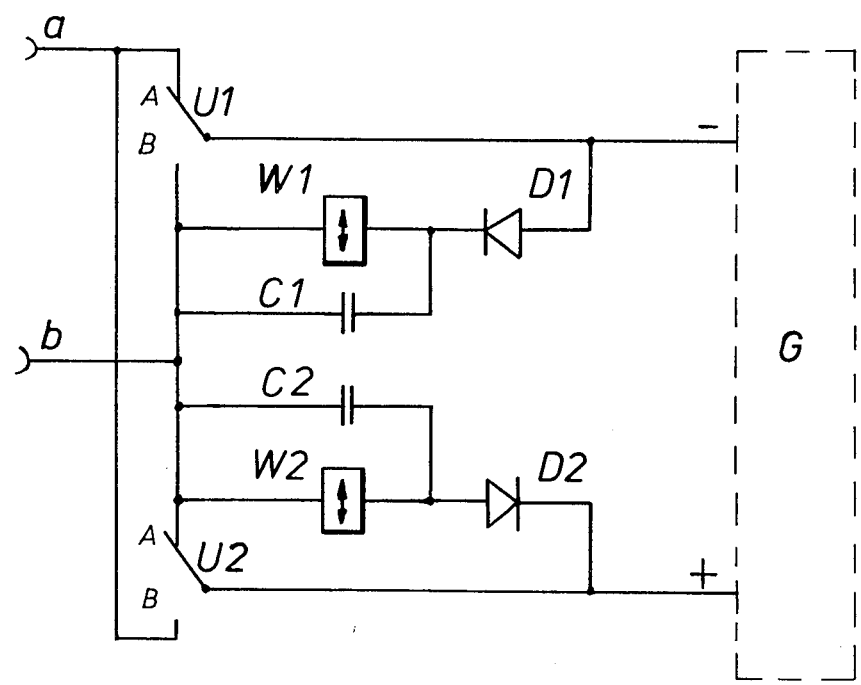

ZERO-LOSS AUTOMATIC POLARIZATION PROTECTION DEVICE

This invention relates to a zero-loss, automatic polarity safeguard device for telecommunication apparatus and aims to provide a simple and inexpensive device of this type.

The use of exchange-battery-fed electronic circuits in telecommunication equipment presents an essential problem regarding the correct polarity activation of the electronic circuits. Since, in the majority of cases, a defined polarity is not guaranteed in the telephone line, the input, that is to say the voltage supply, must be suitably protected. Such protective devices, or safeguards are generally built up with semiconductor diodes which automatically correct the polarity when not properly applied.

However, this method has an essential drawback: due to the semiconductor effect there is a voltage drop and therefore also a loss in performance, or output, which is not of a negligible order in the case of apparatus receiving the driving voltage via telephone cable, such as, for instance, electronic key-dialling circuitry.

It is, however, precisely in this kind of situation that minimum energy absorption is vitally important. The voltage loss has a highly adverse effect potentially jeopardizing the voltage supply for the electronic components and particularly the maintaining of a constant voltage.

It is therefore the aim of the present invention to provide a circuit arrangement which solves the essential problem in the operation of exchange-battery-driven electronic circuits in telecommunication equipment, namely the correct-polarity activation of the electronic unit, completely without voltage drop or loss of energy.

According to the present invention there is provided a zero-loss, automatic polarity safeguard device for telecommunication apparatus comprising a bistable polarised electromagnetic relay device having first and second change-over contacts connecting first and second exchange lines to first and second supply rails and winding means for actuating said contacts, and diode means connecting said winding means to said supply rails and operating to detect the polarity of said supply rails and to energise said winding means to actuate the contacts if such polarities are incorrect.

An embodiment of the invention is illustrated by way of example in the single FIGURE of the accompanying drawing which represents the circuit diagram of a polarity-safeguard device according to this invention.

As shown in the drawing, one wire a of a telephone exchange line cable is connected through a two-position switch U1 (position A) to a negative supply rail, and through a second two-position switch U2 (position B) to a positive supply rail of an electrical device or apparatus G, the negative rail being connected to the anode of a diode D1. The cathode of the diode D1 is connected to a winding W1 of a bistable polarized relay which is connected in parallel with a capacitor C1. The anode of a second diode D2 is connected to a winding W2 of the polarized relay which is connected in parallel with a capacitor C2, the cathode of the diode D2 being connected to the positive supply rail. Furthermore, another wire, b of the exchange cable is connected to capacitors C1 and C2 and through switch-over contact U2 (position A) connected to the positive rail, and through contact U1 (position B) to the negative rail of the apparatus G.

If a negative potential is present at wire a of the exchange cable the desired negative potential will also appear at the same time in the negative rail of the electronic apparatus G.

On the other hand, if wire a of the exchange cable has a positive potential, current flows through switch-over contact U1 and diode D1, through winding W1, whereby contacts U1 and U2 are actuated, connecting contact U1 to wire b of the exchange cable. Due to this new condition or state, the positive potential in a wire of the exchange cable is applied directly via switch U2 (position B) to the positive input terminal of apparatus G.

This is a highly advantageous manner of ensuring that the apparatus G is correctly poled at all times, irrespectively of the potentials in wires a and b. Since there are no semiconductors in the circuit the voltage loss is zero.

The illustrated device may be arranged directly between wires a and b and the speaking wire of a telephone-set circuit, for instance as a module or unit, because there is no risk of distortion. In the case of superimposed alternating and direct voltage components (supply and test voltages) suitable provisions can be adopted (for example delayed switch actuation) to prevent wrong actuation of the polarized relay. To this end various methods may be adopted which are per se known in switching control technology and require no specific illustration or description in the present context.

I claim:

1. A zero-loss, automatic polarity safeguard device for telecommunication apparatus, said device comprising:
    first and second supply rails having respective input and output terminals, said output terminals being adapted to be connected to said telecommunication apparatus, each said supply rail having a predesignated polarity;
    first and second exchange lines;
    first changeover contact for selectively connecting the input terminal of said first supply rail to one of said exchange lines;
    a second changeover contact for selectively connecting the input terminal of said second supply rail to one of said exchange lines;
    bistable polarised electromagnetic relay means coupled to said first and second contacts for simultaneously actuating said first and second contacts to selectively connect said first exchange line to one of said input terminals and said second exchange line to the other of said input terminals, there being no voltage dropping element between said exchange lines and said output terminals of said supply rails; and
    diode means connected between each of said first and second supply rails and said relay means so as to detect the relative polarity of said supply rails pursuant to an input signal on said exchange lines and to selectively actuate said relay means to match the polarity on said exchange lines to the respective predesignated polarity of said supply rails, actuation of said relay means occurring only when the polarity of the signal on said exchange lines does not match the predesignated polarity of said supply rails to which said exchange lines are respectively connected.

2. A zero-loss, automatic polarity safeguard device for telecommunication apparatus, said device comprising:

a bistable polarised electromagnetic relay device having first and second changeover contacts and winding means for actuating said contacts;

first and second supply rails having output terminals adapted to be connected to said telecommunication apparatus and input terminals respectively connected to said changeover contacts;

first and second exchange lines adapted to be selectively connected to said first and second supply rails through said changeover contacts; and diode means connecting said winding means to said supply rails and operating to detect the polarity of said supply rails and to energise said winding means to actuate said contacts if the polarities are incorrect;

said winding means comprising first and second windings for actuating said contacts in opposite directions respectively;

said diode means comprising first and second diodes;

said first winding means connected in series with said first diode between said first supply rail and one of said exchange lines, said second winding means connected in series with said second diode between said second supply rail and one of said exchange lines, said diodes being connected for opposite current flow through said two windings.

3. The device as claimed in claim 2 further comprising first and second capacitors connected in parallel with respective ones of the windings.

* * * * *